United States Patent Office 3,063,916
Patented Nov. 13, 1962

3,063,916
METHODS FOR DETECTING THE PRESENCE OF ANTIBIOTICS
Frank V. Kosikowski, Ithaca, N.Y.
(% Salem-Brosius Inc., P.O. Box 2222, Pittsburgh 30, Pa.)
No Drawing. Filed Apr. 26, 1960, Ser. No. 24,654
8 Claims. (Cl. 195—103.5)

This invention relates to methods for determining the presence of antibiotics in all biological materials and particularly to a rapid, accurate test for determining the presence of antibiotics in foodstuffs.

The use of antibiotics in the treatment of foodstuffs and in the treatment of animals which produce foodstuffs has for a long time created the need for a rapid, accurate test method which could be used by field men, bulk food handlers and the like. This problem has been particularly acute in the fluid milk field and the invention will be specifically described in connection with the testing of milk.

Many test methods have heretofore been proposed for determining the presence of antibiotics. However, these methods, have, without exception so far as I am aware, been subject to the difficulty that the test plates must be maintained under refrigeration until the material to be tested is brought into contact with them or if unrefrigerated the test must be assembled and started immediately. If the temperature rises before the test is made the results are without significance. As a result these tests are not adaptable to use by field men, bulk handlers of food, public health regulatory officials, etc. I have developed a test method which eliminates this very serious difficulty of the past practices and which is not dependent upon refrigeration of any of the test elements and which has a basic simplicity without sacrificing sensitivity and reliability.

The test method of my invention can perhaps be best understood by the following example.

An antibiotic sensitive bacterium is seeded in large numbers throughout plain agar, devoid of organic nutrients, but with or without sodium chloride layered in a disposable culture plate. The plate is placed in a sealed container until ready for use. Preferably the sealed container is in airtight moisture proof, aluminum foil envelope.

A paper disc whose outer dimensions are smaller than the agar plate is treated with water soluble nutrients for the antibiotic sensitive bacterium on the culture plate. When it is desired to test a biological material or a foodstuff such as milk, the paper disc is dipped in the milk or material until wet. The wet disc is applied to the agar surface and pressed lightly onto the surface. The plate is then incubated, preferably at about 35°–37° C., for 4 to 6 hours. The plate is then removed from the incubator and visually inspected. A clear area of no growth around the disc, e.g. a clear halo indicates the presence of antibiotics. The presence of penicillin can be confirmed by the use of a penicillinase disc. A growth of bacteria next to the test disc indicates normal milk free of antibiotics. When using a low-power microscope, results can be obtained with 2 to 3 hours' incubation.

When using the test of this invention for milk it is desirable to heat the milk to 180° F. for 2 minutes prior to test in order to destroy natural inhibitory milk substances which might cause false positive readings.

The agar plates may be held for several months at room temperature (72°–75° or higher) without deterioration and can be stored for longer periods at 40° F. Exposure to freezing should be avoided because of the destabilizing effect on agar. Exposure to very high temperature may tend to cause the agar to exude water. This does not seriously affect the test providing the surface water is poured off the agar before the wetted nutrient disc is placed on the agar surface.

Incubation, while preferably carried out at 35°–37° C. (95°–99° F.), can be carried out at temperatures varying from about 25° C. (77° F.) to about 100° F. Satisfactory incubation may be obtained in the field by the field man placing the test plate and disc in his shirt pocket, by the use of a portable electric incubator operated from an automobile battery, from the heat of a small light bulb, etc.

A growth control disc may be used alongside the milk or other food test disc by simply wetting a test disc with plain water, preferably, boiled, or with a known antibiotic free milk and applying to the agar surface and incubated along with the milk test disc.

The nutrients in the test disc are preferably sugars and nutrients. For example, when using a bacterium such as the spores of Becillus subtilis, a nutrient disc containing the following materials is used.

About 48% peptone
About 48% dextrose
About 4% water

Such a disc when used as described herein will retain the clear zone image over long periods of time in contact with the agar, whereas on long standing by the prior techniques the bacterium would grow in the zone obscuring the result. This made the prior art technique much more prone to error since the incubation time and standing time are critical and obseravtions often are made well after recommended times. The sensitivity of the test of this invention is high, about 0.02 to 0.05 international unit of penicillin per mil of milk for example. Using a ¼″ disc on a milk containing 0.1 international unit of penicillin usually shows a halo diameter of 1.0 to 1.2 cm.

While I have illustrated and described a present preferred practice and apparatus for my method it will be understood that the invention may be otherwise embodied within the scope of the following claims.

I claim:

1. The method of determining the presence of antibiotics in foodstuffs and other biological materials comprising the steps of preparing a plain agar plate containing antibiotic sensitive bacteria and a dry absorbent pad containing a soluble nutrient for said bacteria, wetting the absorbent pad with the material to be tested, placing the wetted pad on the plain agar plate and incubating said plate and pad for a period of time and at a temperature normally sufficient to cause growth of the bacteria.

2. The method of determining the presence of antibiotics in foodstuffs and other biological materials comprising the steps of preparing an agar plate, devoid of organic nutrients, containing spores of Bacillus subtilis and a dry absorbent pad containing a nutrient for said spores, wetting the absorbent paird with the material to be tested, placing the wetted pad on the agar plate and incubating said plate and pad for a period of time and at a temperature normally sufficient to cause growth of said spores.

3. The method as claimed in claim 2 wherein the absorbent pad contains as a nutrient about 48% peptone, 48% dextrose and 4% water.

4. The method as claimed in claim 2 wherein the plate and pad are incubated for about 2 to 6 hrs. at a temperature of about 35°–37° C.

5. A test kit for determining the presence of antibiotics in foodstuffs comprising an agar plate devoid of organic nutrients and containing an antibiotic sensitive bacteria in a sealed impermeable container and a separate absorbent pad of smaller dimension than the agar plate containing a nutrient for said bacteria.

6. A test kit as claimed in claim 5 wherein the sealed container is of impermeable aluminum foil.

7. A test kit as claimed in claim 5 wherein the plain agar plate, devoid of organic nutrients, contains spores of *Bacillus subtilis*.

8. A test kit as claimed in claim 5 wherein the absorbent pad contains as a nutrient about 48% peptone, about 48% dextrose and about 4% water.

References Cited in the file of this patent
UNITED STATES PATENTS 2,761,813    Goetz _____ Sept. 4, 1956

OTHER REFERENCES

Zinsser et al.: "A Textbook of Bacteriology," 1935, Appleton-Century Co., N.Y., pages 709, 1090.

Cerny and Morris: "A Modified Disc Assay Method for Detecting Antibiotics in Milk," 1955, J. Milk and Food Technology, vol. 18, No. 11, pages 281–283.